March 6, 1956 W. T. ROSSELL 2,737,126
DIFFERENTIALLY ACTING BOLSTER CONTROL
Filed Sept. 10, 1951 3 Sheets-Sheet 1
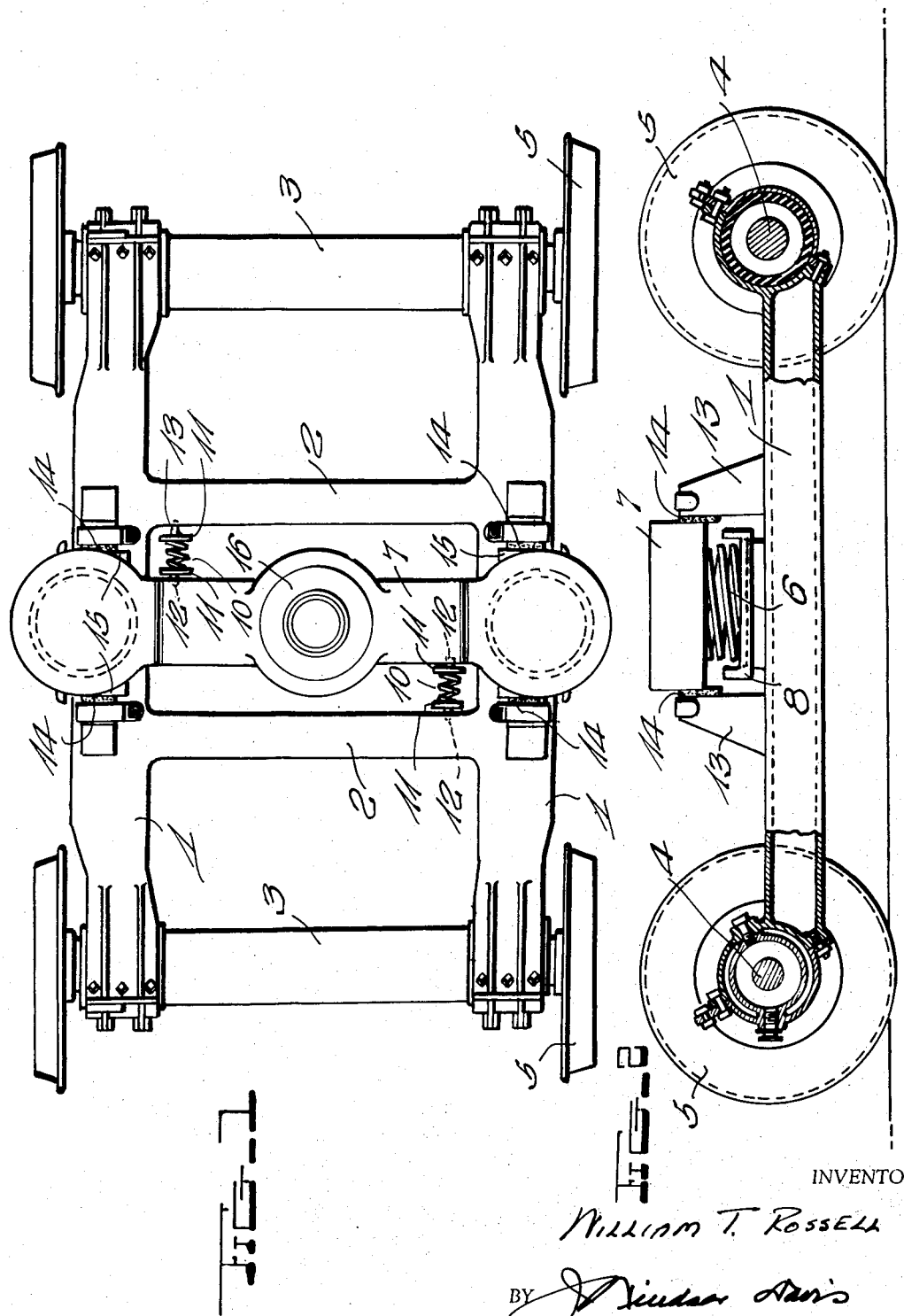
INVENTOR
William T. Rossell
BY
ATTORNEY

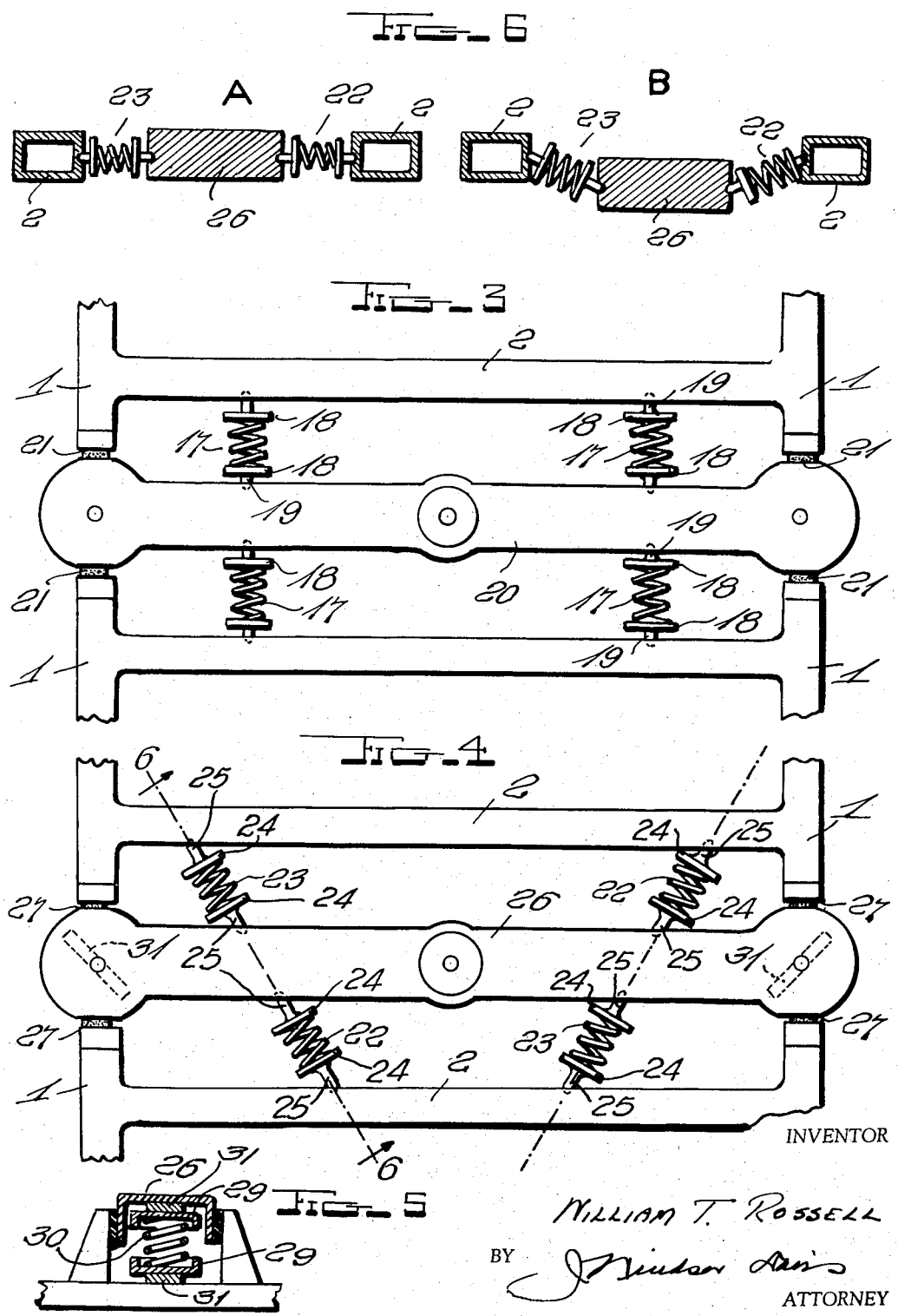

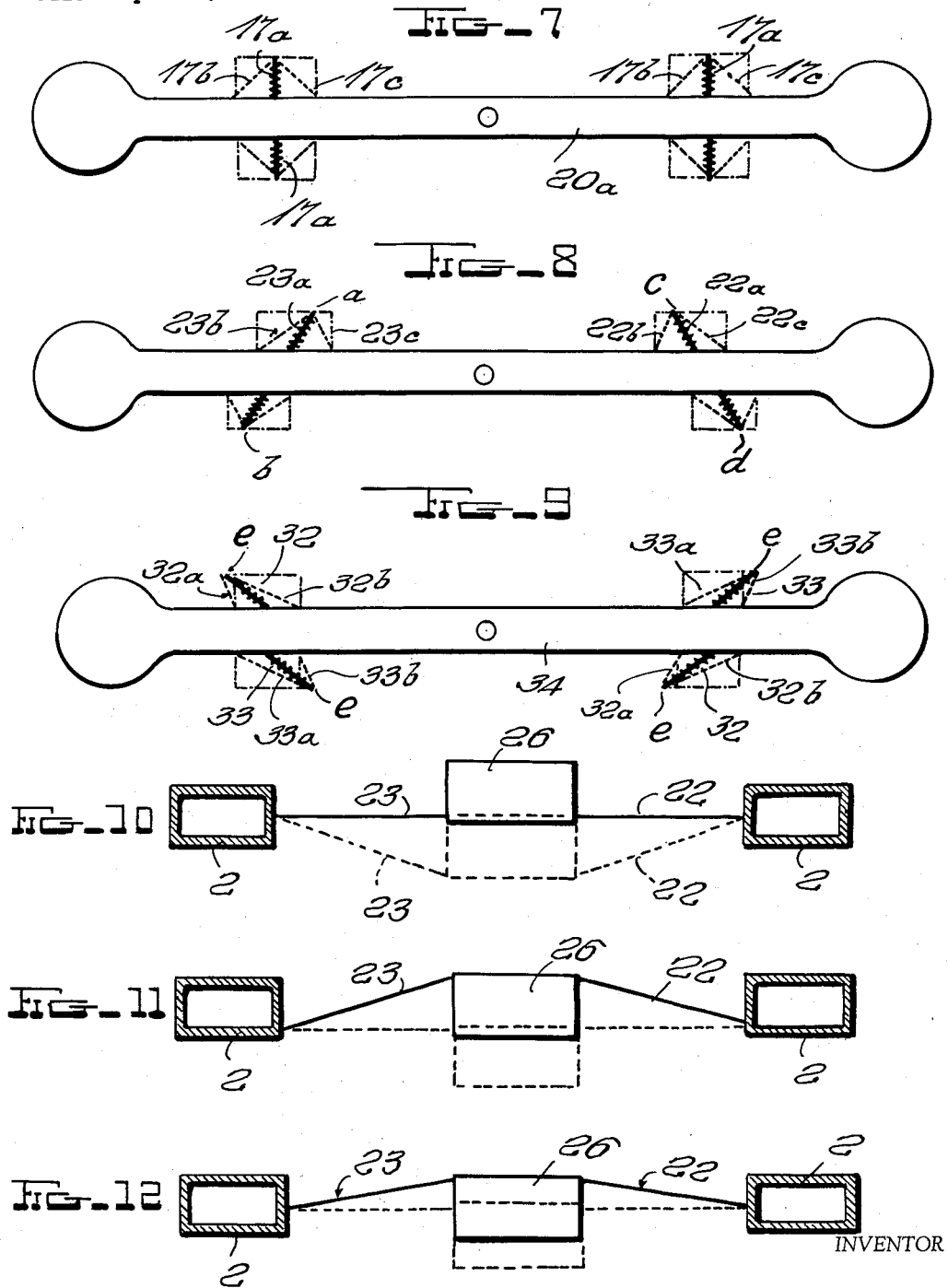

United States Patent Office 2,737,126
Patented Mar. 6, 1956

2,737,126

DIFFERENTIALLY ACTING BOLSTER CONTROL

William T. Rossell, New York, N. Y., assignor to Transit Research Corporation, New York, N. Y., a corporation of New York Application September 10, 1951, Serial No. 245,833

4 Claims. (Cl. 105—187)

This invention relates to rail trucks, and has for its object to provide a truck of improved riding quality with particular attention to the matter of equally good riding irrespective of changing amounts of loading thereon.

There are a number of factors which affect the riding qualities of a rail vehicle. For instance, undue hunting motions, insufficient spring movements and numerous other considerations. Further, where all of the various factors are sufficiently well met, in terms of design, that good riding results, it is common knowledge that those good results may change from good to poor as soon as the load changes from a narrow specific amount or range. This is of particularly great moment in transit vehicles, for instance, where the full load of passengers may almost equal the weight of the body. One usual result is to find good riding quality under full load conditions, but a ride which deteriorates in quality as more and more passengers dismount. However, there are many trucks in service which ride best under either light load or medium load conditions and which give progressively poorer rides as the load varies from those conditions. The reason for the variation is that, where springs support the bolster, if the returning force of those springs, with respect to bolster swinging movements, is sufficient under heavy loads, it will be found to be too great under light loads and if it is correct for light loads, it will be insufficient for heavy loads.

The principal object of this invention is to provide spring means auxiliary to the bolster supporting springs so arranged and placed that they may function to weaken or to strengthen the returning force of the bolster springs with changing amounts of body loading thereon. In other words, I provide auxiliary springs which, by a proper placement with respect to the bolster and the truck frame and by proper selection of the characteristics of the springs, will be able to give a lateral bolster swinging rate for light and heavy car loading proportional to the mass and of the same natural frequency.

More specifically it is an object of this invention to provide springs which act on the bolster in such manner that they may add a force to certain movements thereof and which, furthermore, may have no effect on still other movements thereof, the movements thus affected or disregarded or the degree thereof automatically changing with changing body loads. As will become hereinafter more fully apparent, a wide choice is offered a truck designer in selecting the particular movements or partial movements over which he desires to exercise control.

Another object is to provide auxiliary springs, as above described, which may oppose, reinforce or remain neutral to various bolster movements and which in several forms hereinafter more specifically described, set up motions of the bolster which readily lend themselves to the energization of snubbing means. The use of the auxiliary spring means and the snubbing means together results in a new kind of rail ride in which normal lurching or rolling of the body caused by poor track conditions will be followed by rebounds so lifeless that the passengers are unaware of the return of the bolster to its centered position. Stated another way, the springs plus the snubbing constitutes the resistance to swinging movement of the bolster while the springs minus the snubbing constitute the returning force. The latter can be made about zero leaving the bolster substantially without energy as it returns to centered position.

Other objects and advantages will become hereinafter more fully apparent as reference is had to the accompanying drawings in which my invention is illustrated and in which Figure 1 illustrates the plan view of a rail truck equipped with my invention and in which the bolster is supported from the truck frame by main springs, Figure 2 is a side elevation of the truck of Figure 1, Figure 3 is a plan view of the midsection of the truck of Figures 1 to 3 showing a modified form of auxiliary bolster springs, Figure 4 is a view similar to Figure 3 showing a modified arrangement of the auxiliary bolster springs, Figure 5 is a vertical section through one end of a modified form of bolster, Figure 6A is a vertical section taken along the line 6—6 of Figure 4 showing the bolster under light load condition, Figure 6B is a view similar to Figure 6A showing the bolster under heavy load condition, Figures 7, 8 and 9 are diagrammatic plan views of the central portion of the truck for purposes of explaining the control of horizontal forces acting on the bolster, and Figures 10, 11, and 12 are diagrammatic vertical views corresponding to Figures 6A and 6B for the purposes of explaining the vertical forces acting on the bolster.

More particularly, the main frame of the rail truck is composed of side rails 1 connected by two cross members 2 and by axle housings 3 for axles 4 upon the outer ends of which the wheels 5 are mounted. Main springs 6 support the bolster 7 from the side frames 1, these springs each resting in a cap 8 which rests on the top of a side frame.

Between the bolster 7 and the cross members 2 I provide two auxiliary springs 10 each seated, at both ends in spring caps 11. Each cap 11 has a ball rocker 12 outwardly thereof seated in a cup-like seat in the bolster and cross members, respectively. The springs 11 are diagonally spaced with respect to the center bearing 16 of the bolster.

Arising from the side frames 1 are brackets 13 which serve as retainers for non-metallic friction members 14. The side walls 15 of the ends of the bolster 7 are flattened for frictional contact with the elements 14.

The operation is as follows: Assume that, under light load conditions of the bolster, the springs 10 are substantially horizontal and that, when the bolster is centered, they are substantially normal to the bolster center line. Assume also that the springs are under substantial compression so that as the bolster swings through a substantial distance they do not lose all of their compression. Under these conditions, the springs, when the bolster is centered, urge the bolster to rotate horizontally in a counterclockwise position (Figure 1) thus setting up frictional resistance against swinging movement of the bolster by pressing two diagonally opposite surfaces 15 into contact with their friction elements 14. Now assume that the bolster 7 swings laterally of the truck. The ball rockers 12 each rock in their seats as one end of each spring 10 is moved by the bolster. The force of each spring 10 is then exerted as two components, one of the components of each spring still acting to urge the bolster against two diagonally opposite friction elements 14 and weakening with increasing swinging of the bolster; the other component of each spring urges swinging of the bolster and opposes return swinging movement thereof. The result is that there is always a snubbing frictional resistance to the swinging movement of the bolster which is at maximum when the bolster is centered, that the auxiliary springs thereafter aid the bolster to reach their maximum swing and thereafter oppose return thereof in addition to building frictional resistance to such return. The energy in the bolster should thus become almost zero when the bolster returns to centered position. Since the springs 10 were assumed to be horizontal under light load conditions of the bolster, it is obvious that when the bolster is loaded the springs 6 will be further compressed and hence the springs 10 will lengthen when the bolster is in centered position. The springs 10 will further lengthen as the bolster swings and hence their expansion force will run out much earlier than under light load conditions. The springs 10, in this case, exert their maximum effect under light load conditions and automatically reduce the effect which they exert under increasing load conditions. If the springs 10 are so positioned that they become horizontal as the bolster becomes fully loaded, then the effect will be the opposite of that above described.

If now, the auxiliary springs are duplicated on each side of the bolster, as illustrated in Figure 3, in which the springs 17 with the spring caps 18 and ball rockers 19 correspond to the springs 10, caps 11 and rockers 12 of Figure 1, the effect will be different. In this case let it be assumed that the springs 17 are all of equal strength and that all have the same run out. The bolster 20, when centered, is in equilibrium laterally and also there is no tendency for its rotation against the friction elements 21. As the bolster moves laterally of the truck the springs exert a linear force and act as a toggle. The forces which they exert remain balanced in a fore and aft direction of the truck and hence exert no force tending to rotate the bolster. However, as swinging increases the component of the force which the opposed springs exert against each other decreases and the other component of force which they exert is in the direction of encouraging swinging movement of the bolster while opposing its return to centered position. The ends of the bolster 20 contact the friction elements 21 during acceleration or deceleration of the truck thus acting as a transom.

Now, please refer to Figure 4 in which the auxiliary springs 22 and 23 each have spring caps 24 with ball rockers 25 corresponding to the springs 17, caps 18 and rockers 19 of Figure 3. In this case the springs 22 and 23 are inclined in a horizontal plane with respect to the bolster and the springs 22 are suitably but not necessarily coaxial with the springs 23 when the bolster is in centered position. When the bolster 26 is in centered position, as illustrated, it is in equilibrium in that there is no tendency for it to rotate against the friction elements 27 and there is no tendency for it to swing in either direction. If the springs 22 exert any greater force than the springs 23, or vice versa, then the bolster will be rotated against diagonally opposite elements 27 thus setting up an initial friction opposing initial swinging movement of the bolster. This latter condition would only be desired in case of bad tracks and would ordinarily not be desirable because it increases the number of short wave vibrations transmitted from the wheels to the body.

Now, suppose that the bolster swings laterally to the right, as viewed in Figure 4. The diagonally opposite springs 22 will progressively approach a position normal to the center line of the bolster 26 thus causing the bolster to rotate against diagonally opposite elements 27 with increasing force. During this time, the component of the springs 23 which tends to urge rotation of the bolster counter to the direction urged by the springs 22 decreases and their component which urges the bolster in the direction of its swing increases. Return of the bolster is similarly opposed by the springs 23 and by the friction of the elements 27 so that, by the time the bolster returns to centered position the energy of the swinging movement should be practically zero. In the event that the snubbing effect is not sufficient to reduce the energy to zero, the snubbing may be increased by using spring caps 29 for each end of the springs 30 which support each end of the bolster and by providing each of these spring caps 29 with rockers 31 positioned at an angle of 45° to 55° with respect to the bolster and horizontally inclined similarly to the axis of the springs 22 and 23 as shown in Figure 5. These rockers 31 cause the springs 30 to tilt with swinging of the bolster, the direction of the tilt being in the direction of rotation of the bolster under the influence of the springs 22, 23.

It will be seen that different effects of controlling the bolster may be had with different positioning of the auxiliary springs. The principles involved will be better understood by referring first to Figures 7, 8, and 9.

Figure 7 diagrammatically shows the spring arrangement of Figure 3 with the same parts being designated with the same numerals followed by the letter "a." The bolster 20a is shown in centered position with the springs 17a normal thereto. The bolster can swing to the right or left causing the springs to assume a maximum displaced position 17b as the bolster swings to the left and causing the springs to assume a maximum displaced position 17c as it swings to the right. The bolster is always in equilibrium with respect to rotative forces so that the action of the auxiliary springs is that of a toggle.

Now, if we construct a rectangle using the height of the spring 17a as the altitude and the distance between the points of swing of the moving end of the spring as the base we find, in Figure 7 that the fixed end of the spring is at the center of the upper base, the upper base being on a cross member of the truck. If we move that point of attachment of the spring 17a to another point of attachment on the upper base, the condition of equilibrium is immediately disturbed.

In Figure 8, for instance, the point of attachment is moved half way between the point of attachment shown in Figure 7 and one corner of the rectangle, the point of attachment of one spring being moved to a point $a$ while that of the spring on the other side of the bolster is moved in opposite direction to a point $b$. The points of attachment of the other two springs are moved to points $c$ and $d$ respectively, being moved in directions opposite to the movement of that of the springs on the same side of the bolster with each thereof. This figure is illustrative of the showing of Figure 4 in which the springs 22 and 23 appear as 22a and 23a with the extreme positions of the springs being represented by the dotted lines 22b and 22c and by the dotted lines 23b and 23c, respectively.

It may be taken as the rule that when the anchorage of the auxiliary springs are moved anywhere off-center to a point "a" along the fixed base of the rectangle except at the center as shown in Figure 7, the springs being arranged in opposition in the manner illustrated in Figure 7 that the auxiliary springs will aid the bolster as it swings outwardly and oppose return movement thereof; also they will urge the bolster in a counterclockwise direction against two diagonally opposite friction elements 27 when swinging to the left of center and against the other two friction elements when swinging to the right while urging the bolster to rotate in a clockwise direction. If the springs are properly selected for length and run-out of force as previously mentioned, the effect of the auxiliary springs will be to weaken the main springs 6 to the point where the bolster will lazily return to center at which point it will be substantially without energy. The passengers in the body carried by such a truck should not be conscious of the fact that the bolster and body have returned to centered position.

If the point of anchorage of the springs 23a is now moved to a point $e$, Figure 9, outside the above described rectangle the auxiliary springs then strengthen instead of weakening the main springs 6. In this figure the springs 32 and 33 correspond to the springs 22 and 23 of Figure 4. As the bolster 34 swings to the left, the springs 32 assume the maximum outward position 32a and the springs 33 assume the maximum outward position 33a whereas when it swings to the right the springs may attain the maximum positions 32a and 33b. As the bolster swings to the left, the springs 32 will resist the movement with a force which increases with increasing movement and which also builds up a component in a direction tending to rotate the bolster counterclockwise against snubbing elements, but the longitudinal component never disappears. The spring 33 in moving to the position 33a urges the bolster in the direction of its swinging, but the spring is expanding and losing force while the force in the spring 32 opposing the motion builds up. The net result will be an opposition to the movement thus reinforcing the main springs 6. The springs will act in reverse as the bolster swings to the right from centered position.

The foregoing explanation with respect to Figures 7, 8, and 9 has been made under the assumption that the axis of the auxiliary springs are substantially horizontal. The same effects will occur when the auxiliary springs leave the horizontal, but with progressively decreasing effect because they will be getting longer and longer and hence approaching their run-out. The manner in which they leave the horizontal depends on the election of the truck designer. Thus, if a truck rides satisfactorily under heavy load conditions and poorly under light load conditions, the auxiliary springs should be horizontal under light load conditions in order to exercise their maximum control at that time. This is illustrated in Figure 6 in which the bolster 26 is represented as being under light load in Figure 6A and under loaded conditions in Figure 6B. It is obvious that the springs 23 and 22 have substantially expanded so that as the bolster 26 thereafter swings the effect of the auxiliary springs is substantially reduced and may be entirely lost after any selected portion of the swinging movement.

This is diagrammatically illustrated in Figures 10, 11, and 12 in which the bolster 26 in Figure 10 is shown in full lines, in light load position with respect to the cross members 2 and in fully loaded position in dotted lines. In this case the auxiliary springs 23 are horizontal under light loads and extended under heavy loading, as explained in connection with Figures 6A and B.

Now, if best riding of the truck to which my invention is applied occurs under light load conditions, then the springs 22 and 23 should be inclined as illustrated in full lines in Figure 11 and when the bolster is depressed with respect to the cross members 2 under heavy loading the auxiliary springs should come to a substantially horizontal position.

In the case of some railway cars, for instance, where the weight of the body is much greater than that of the passengers and where only a relatively few passengers are carried, it may be the desire to obtain maximum control of the bolster under an intermediate loaded position. In this case the springs 22 and 23 may be given a slight upward slope under light car loading as illustrated in Figure 12 so that under intermediate loading, they will reach a horizontal position, as shown in Figure 12.

The provision of auxiliary springs impressing forces laterally and longitudinally of the bolster thus offers a means of controlling the actions of a bolster and lends itself to cooperation with friction snubbing devices.

There is a wide choice of adaptation available to a designer to improve the ride of various kinds of trucks operating in numerous types of services and I desire to be extended protection as defined by the appended claims.

I claim:

1. The combination of a rail truck comprising a truck frame, a bolster and main springs supporting said bolster from said frame, and auxiliary springs each connected at one end to said frame and at its other end to said bolster, said springs being positioned transversely of the length of said bolster and under compression when said bolster is centered, said springs each having a spring seat at each end thereof pivotally connected to said bolster and said frame respectively, said springs being adapted to expand upon movement of said bolster off its centered position.

2. The combination of a rail truck comprising a truck frame, a bolster and main springs supporting said bolster from said frame, and auxiliary springs each pivotally connected at one end to said frame and at its other end to said bolster, said auxiliary springs being positioned transversely of the length of said bolster, said bolster varying in height with respect to said frame under varying body loads thereon thereby altering the height of the ends of said auxiliary springs with respect to each other, said auxiliary springs being horizontal and under compression under a predetermined body loading and at a predetermined position of the bolster with respect to its lateral swinging movement, said auxiliary springs being adapted to expand upon movement of said bolster either laterally or vertically from its horizontal or laterally predetermined position.

3. In a rail truck, a truck frame, a bolster, main springs supporting each end of said bolster from said frame, said bolster changing in height with respect to said frame under changing body loads on said bolster, said bolster also being adapted to swing laterally of the direction of travel of said truck, spring assemblies located between frames and said bolster, each of said assemblies comprising a spring, a cap for each end of each spring and a rocker on which said caps rock, the rocker at one end of each of said assemblies contacting said bolster, the rocker at the other end of each of said assemblies contacting said frame, the springs of each of said assemblies being normal to the longitudinal center line of said bolsters and horizontal when said bolster is in one position of normal operation and loading.

4. In a rail truck, a truck frame, a bolster spring supported by said frame and spring assemblies toward each end of said bolster between said frame and said bolster, said spring assemblies each comprising springs arranged in a fore and aft direction with the direction of travel of said truck, said assemblies each comprising a spring and spring caps having rockers outwardly thereof, said rockers directly contacting said frame and said bolster respectively, said springs each increasing in length when said bolster swings laterally of said frame and exerting a composite force in the direction of the swinging movement.

References Cited in the file of this patent

UNITED STATES PATENTS

| | | |
|---|---|---|
| 384,317 | Hubbard | June 12, 1888 |
| 639,273 | Nicewaner | Dec. 19, 1899 |
| 716,294 | Shallenberger | Dec. 16, 1902 |
| 1,517,182 | Viberg et al. | Nov. 25, 1924 |